Nov. 22, 1966  G. H. CHARNOCK, JR  3,286,355
STRETCH COMPENSATING DEVICE FOR LINE-UP TABLE
AND METHOD OF COMPENSATING
Filed March 24, 1964  4 Sheets-Sheet 1

Inventor:
George H. Charnock, Jr.
by
Attorney

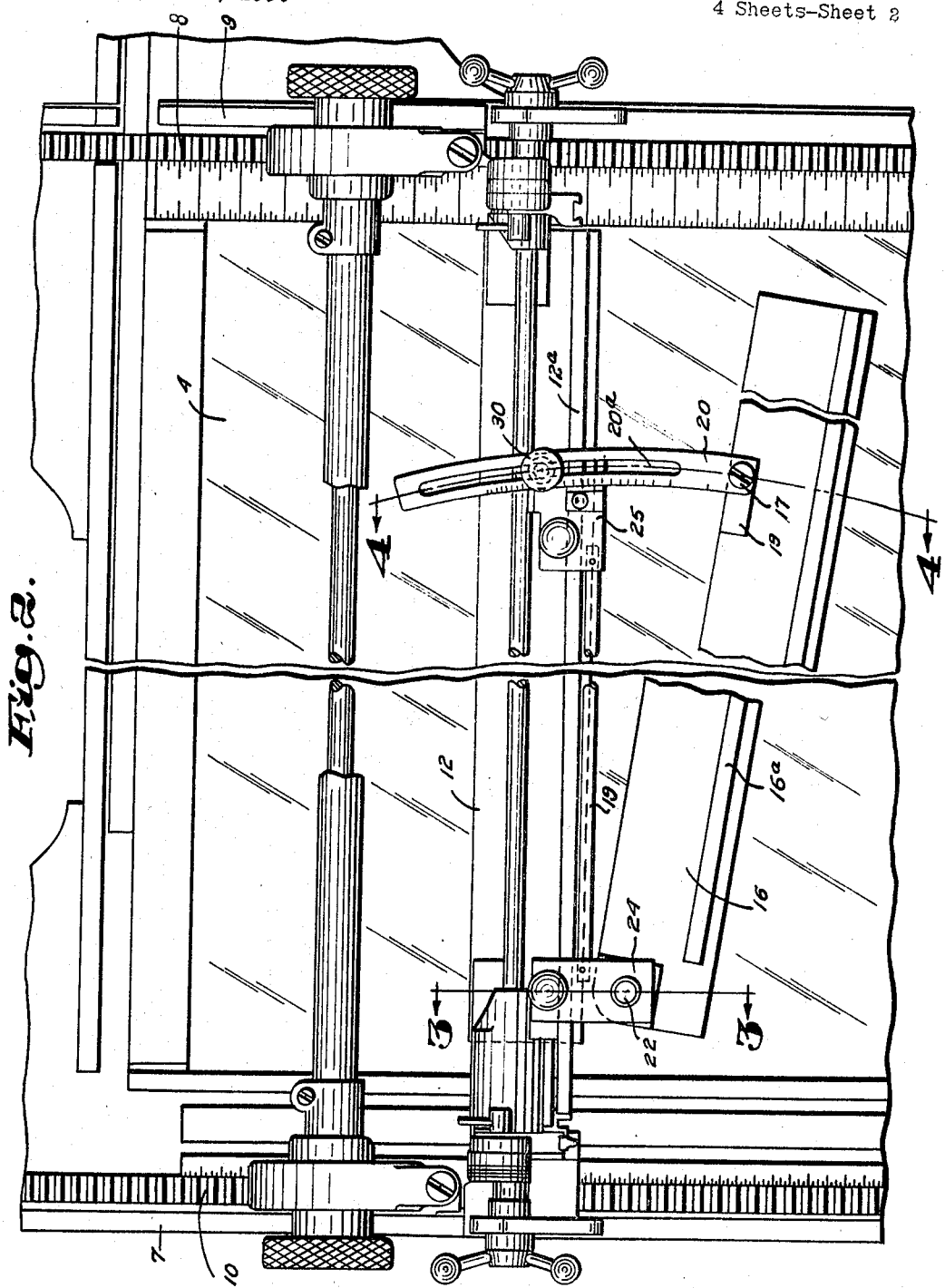

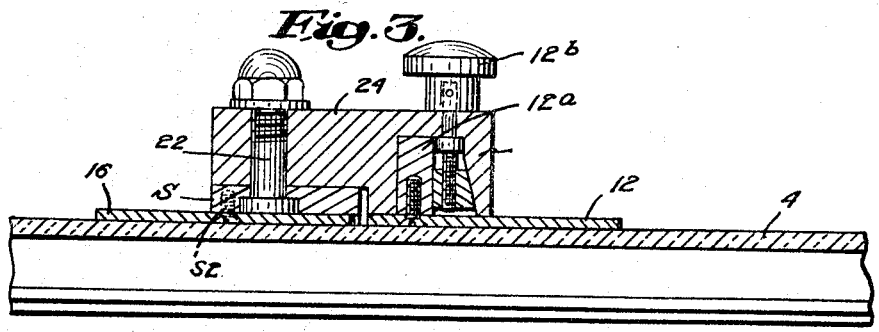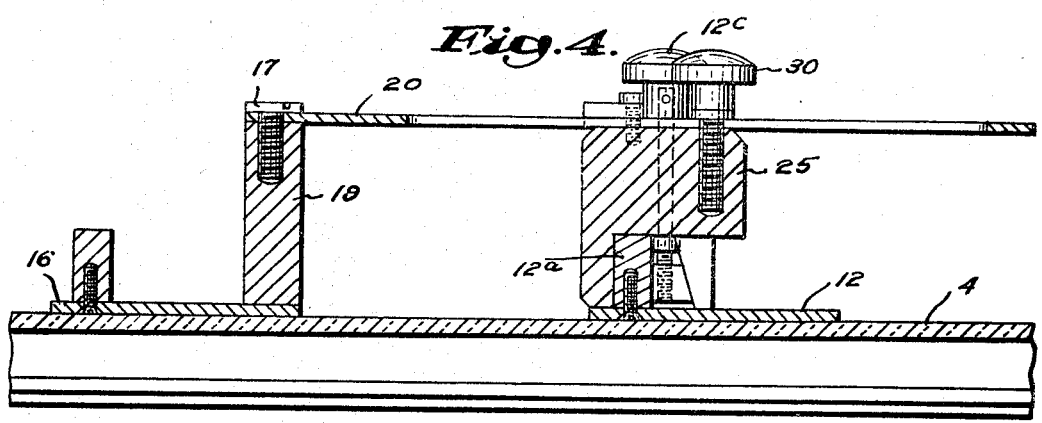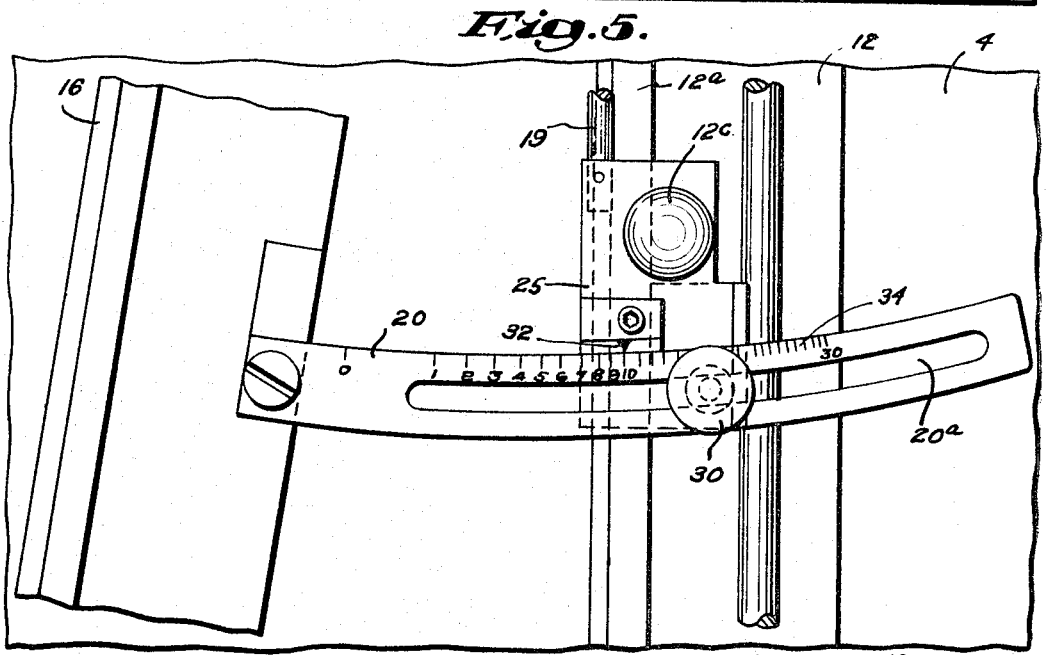

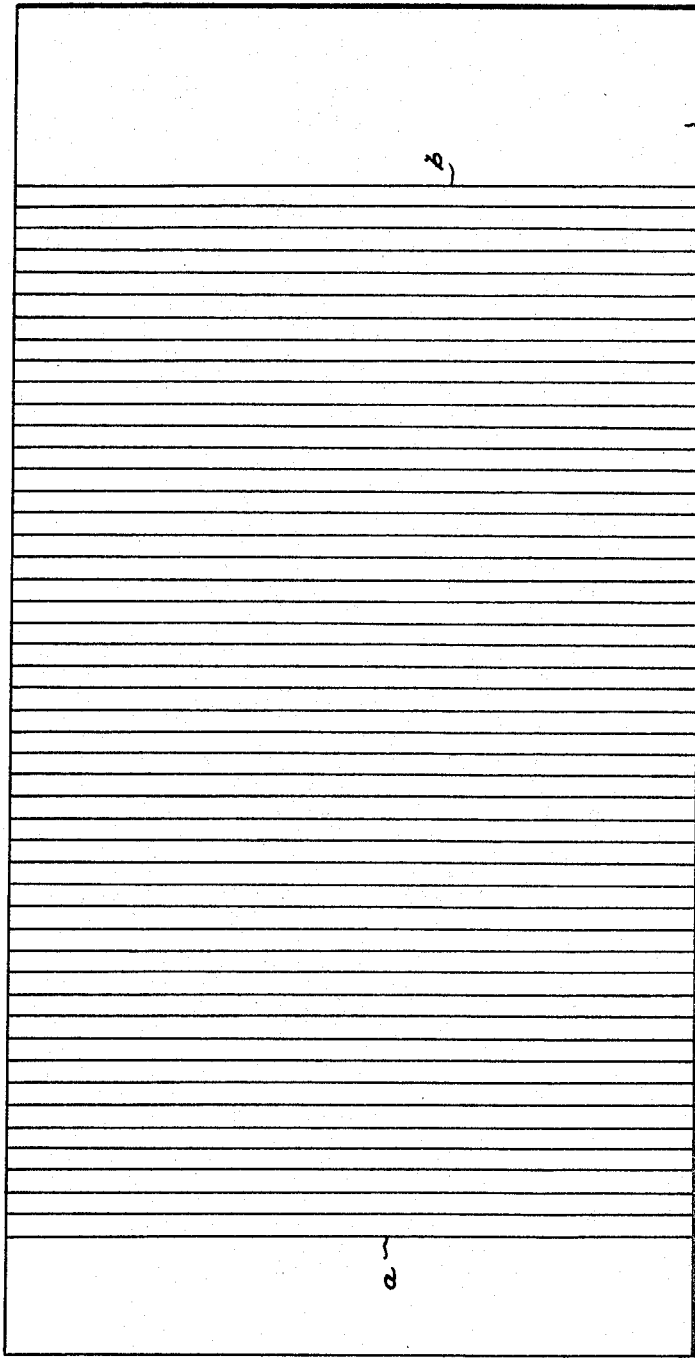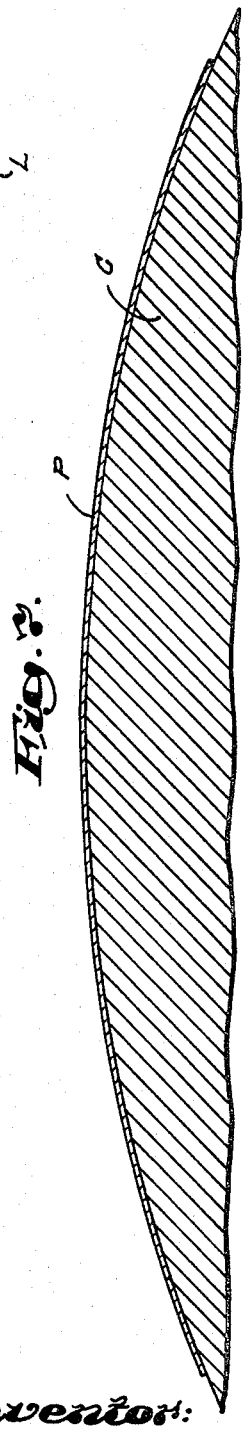

United States Patent Office 3,286,355
Patented Nov. 22, 1966

3,286,355
STRETCH COMPENSATING DEVICE FOR LINE-UP TABLE AND METHOD OF COMPENSATING
George H. Charnock, Jr., Newton Center, Mass., assignor to American Photocopy Equipment Company, Evanston, Ill., a corporation of Illinois
Filed Mar. 24, 1964, Ser. No. 354,237
4 Claims. (Cl. 33—184.5)

This invention relates to a proportionating method and device and, more particularly, to an attachment for use with a line-up and register table of the class commonly employed for lay-out work and similar operations in the graphic arts industry where a precise spacing of ruled lines or other subject matter is required and wherein a dimensional change in the arrangement of the ruled subject matter may be desired to be carried out.

Reference is had especially to one commonly experienced difficulty in the making of printing plates which are to be mounted around an arcuate printing member such as a printing cylinder. In the usual preparation of a flat layout sheet using a line-up and register table of the well-known class such as, for example, that disclosed in Patent No. 2,410,559, ruling is carried out on the flat layout sheet to provide precise dimensions which can be reproduced in a printing plate made from the layout sheet. However, when a printing plate made in this manner is placed around and secured to an arcuate surface such as the surface of a printing cylinder, a small degree of dimensional change occurs with the plate being stretched a slight degree and the spacing of the ruled subject matter may become slightly increased. Thus an undesirable error in the finished work may result, particularly where the fractional increase in spacing is of appreciable magnitude for any given layout job.

The chief object of the invention, therefore, is to provide a novel proportionating method and device which is particularly suitable for dealing with the stretch problem present in making printing plates used on printing cylinders and which may also have application in various other instances where a controlled proportionating change is desired.

I have conceived of a proportionating method and device by means of which a dimensional change which compensates for plate stretch may be readily and conveniently carried out at the time the flat layout sheet is prepared on the line-up and register table. The proportionating method and device, although not limited to this particular problem, is especially satisfactory in providing for the inscribing of successive ruled lines which are caused to occur at predetermined positions of angularity with respect to the line of travel of a straight edge mechanism.

In this connection I have further devised as a part of the reference straight edge mechanism an adjustable ruling guide edge element and a computed scale of values which are related to dimensional changes desired. By regulating the position of angularity of the lines in accordance with this scale, a precise compensation for stretch, as well as any other desired proportionating operation may be realized.

In one preferred embodiment of the invention, I may utilize as a part of my improved straight edge mechanism one of the conventional straight edge components of a line-up and register table and the arrangement of parts is such that an adjustable ruling guide edge element can be detachably secured to the pen track of the conventional straight edge component. It should be understood, however, that other types of reference straight edge members may be employed with parallel spaced guiding sides, as well as various other similar arrangements.

The nature of the invention and its objects will be more fully understood and appreciated from the following description of a preferred embodiment of the invention combined with a line-up and register table and selected for purposes of illustration and shown in the accompanying drawings, in which:

FIGURE 2 is a fragmentary plan view of portions of the table shown in FIGURE 1 and more clearly showing the stretch compensating apparatus of the invention in an operative position relative to the standard straight edge of the table;

FIGURE 3 is a cross section taken on the line 3—3 of FIGURE 2;

FIGURE 4 is a cross section taken on the line 4—4 of FIGURE 2;

FIGURE 5 is an enlarged fragmentary plan view of an arcuate scale component of the stretch compensating apparatus;

Figure 1:
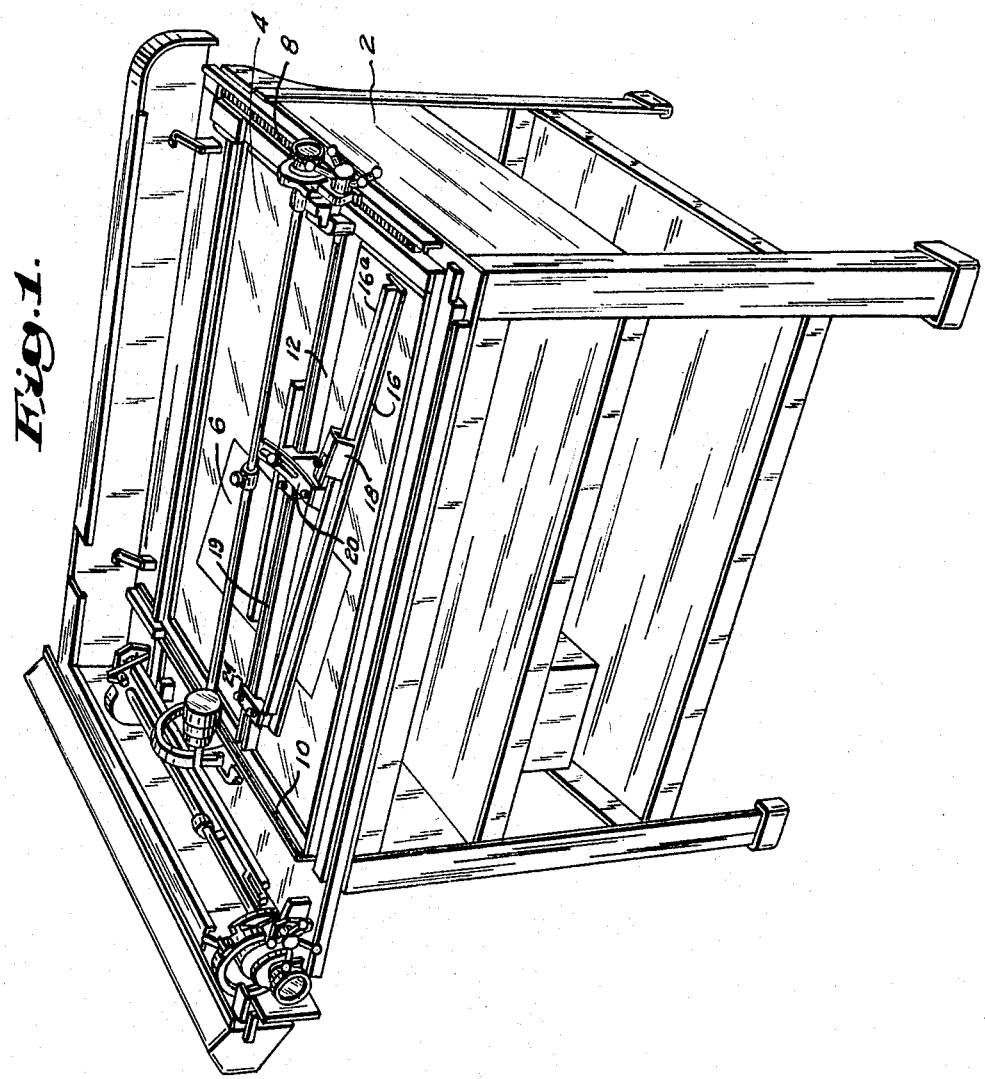
FIGURE 1 is a perspective view of a typical register and line-up table of the type used in the graphic arts industry for preparing layout sheets and incorporated with the standard straight edge mechanism of the table is the compensating straight adge apparatus of the invention.

FIGURE 6 is a plan view of a typical layout sheet consisting of a ruled form having lines with spacings which compensate for stretch of a printing plate to reproduce this subject matter according to scale; and FIGURE 7 is a fragmentary cross sectional view showing a printing cylinder having a plate mounted thereon and containing the subject matter of the ruled form in FIGURE 6 in the stretched working dimension it assumes when in operation for printing the subject matter on a desired scale.

In general, the apparatus of the invention comprises a movable straight edge assembly having both a reference straight edge and a ruling straight edge attachment which can be mounted on the reference straight edge to move with it. In one simple form the attachment includes a supporting rod structure on which the ruling guide may be located and pivotally moved into varying positions of adjustment. The supporting rod structure is provided with means for clamping or fastening to the reference guide component.

It should be understood that in its simplest form the apparatus of the invention may be comprised by any movable straight edge arrangement which is supported so that it may be guided between two parallel side members. However, in a typical line-up and register table, the horizontal straight edge mechanism constitutes one convenient type of reference straight edge to which the attachment may be applied in a convenient and effective manner. Therefore, the invention will be described with reference to the use and mounting of the invention on a line-up and register table, although it is not intended that the invention is to be limited in any way by this illustration of use on such a table.

Referring more in detail to the drawings and, in particular to FIGURE 1, numeral 2 denotes a typical line-up and register table commonly employed in preparing layout sheets for making printing plates. The table at its upper side is provided with a translucent support member 4 which is adapted to receive thereon a layout sheet 6. The table top is formed with two opposite parallel sides 7 and 9 having gear tracks as 8 and 10 and gears meshing therewith. The gears are adapted to move and advance a horizontal or transverse straight edge mechanism which includes a reference straight edge member 12. The member 12 is at all times maintained in a right angularly extending position with respect to sides 7 and 9 and therefore is conveniently referred to as a "reference straight edge."

It will be understood that by well-known control mechanism located at either side of the line-up table the straight edge mechanism may be raised and lowered as desired and also may be periodically moved along the support 4 under the control of a conventional spacing device.

In accordance with the proportionating method of the invention, I provide for periodically advancing the straight edge mechanism through predetermined distances and in each position of advancement there is applied to the layout sheet a series of angled ruled lines. These lines are spaced apart distances less than the distances of travel of the reference straight edge member 12 in moving from one predetermined distance to another in accordance with a required schedule of line spacings.

In carrying out this method of applying ruled lines with controlled predetermined decrease in spacing, I combine with the straight edge mechanism the ruling guide edge above referred to indicated in the drawings by the numeral 16. The ruling guide edge 16 is arranged to be pivotally moved into varying positions of angularity and is adjustably held on a supporting rod structure made up of a spacing rod 19 and inner and outer fastening blocks 24 and 25. The fastening blocks 24 and 25 may be engaged, for example, over a rail portion 12a of the straight edge member 12 and adjustably secured by means of screw fastenings as 12b and 12c better shown in FIGURES 3, 4 and 5.

The ruling guide edge 16 is pivotally attached to a recessed underside of the block 24 on a pivot screw 22. The member 22 is received in a small spacing block S which is fastened to ruling edge 16 by a screw member S2 as shown in FIGURE 3. By means of this arrangement it will be observed that the ruling edge 16 may be pivoted into varying positions of angularity such as suggested in FIGURE 2.

At its outer end the ruling edge 16 is further provided with an adjustment arm 20. Arm 20 is secured in a raised position by a fastening 17 which extends into a block member 19 as shown in FIGURE 4. The arm 20 is of arcuate form and constructed with an inner slot 20a which extends throughout a large part of its length. Adjustably threaded into the block 25 is a retaining screw 30 which passes through the slot 20a and which when tightened is adapted to adjustably clamp the arm 20 against an upper surface of the block 25 in a position such as that shown in FIGURES 4 and 5. Also provided at the upper side of the block 25 is an indicator arrow 32 which is adapted to register with scaled divisions of a scale 34 formed at the inner upper surface of the arm 20.

Scale 34 is formed with a series of progressively decreased divisions as shown in FIGURE 5. The various divisions from 0 to 30, shown in FIGURE 5, comprise a computed scale which is read in thousandths of an inch. Each of these thousandths refers to a change in dimension which may be desired to be made in the spacing of the ruled lines on the layout sheet in order to compensate for a condition such as printing plate elongation earlier discussed in the specification.

Moving the arm 20 and scale 34 to register with arrow 32 as suggested in FIGURE 5, operates to locate the ruling edge 16 in an angled position such that a small proportionate decrease in a spacing will occur relative to the distance of travel of the reference guide edge 12. It will be understood that the scale 34 is made up for angular settings of the guide edge 12 having regard for one given distance at which the scale 34 is located from the pivot point of the edge 16. If this distance is varied, then a different set of divisions will be computed and formed on the surface of the arm 20.

As illustrative of the method of proportionating described, I have shown in FIGURES 6 and 7 a layout sheet L having dimensions of approximately 5½ x 10 inches. FIGURE 7 illustrates a printing plate P which is made from the layout sheet L and mounted around a cylinder C. Assuming the ruled subject matter included between lines a–b (FIGURE 6) is required to measure 8 inches in the printing plate P when installed on a cylinder, the space between a–b has to be reduced a definite amount for each of the 8 inches. By measurement it may be determined that the area within the printing plate P in which the ruled material occurs, when the plate is formed into a curved shape, increases in dimension an amount of approximately .128 inch.

Since the ruled subject matter specified for the layout sheet was to be 8 inches in size, then the total stretch feature of .128 inch is divided by 8 to give a value of .016 thousandths per inch. This figure of .016 thousandths represents the amount of decrease of each inch of layout subject matter which is necessary to compensate for finished plate stretch. Therefore, the reading 16 on the scale 34 is set in register with the arrow 32, to indicate .016 thousandths. The arm 20 is thus positioned to provide a degree of angularity which provides the desired correction. The arm 20, thus positioned, is secured in place by fastening member 30 and the layout sheet L is placed in position to align its bottom edge with the ruling edge 16. The first line is then ruled. Thereafter, the reference straight edge 12 is advanced predetermined distances originally specified for the layout sheet and in each position of advancement lines are ruled along edge 16 as shown in FIGURE 6 to thereby define a number of spaces whose total dimension longitudinally is decreased by an amount of .128 inch. The printing plate P, shown in the drawings, is intended to represent a plate made from a compensated layout sheet so as to avoid an undesirable stretch error.

From the above description it will be apparent that I have disclosed an efficient and practical method and means for controlling plate stretch errors and making other desired proportionating changes. The device is extremely simple in construction and instantly attached or removed from a table. Although the invention has disclosed a ruling of lines, it is intended that other types of subject matter may be laid down on a surface in successive steps to get a range of dimensional changes either on a line-up table or other straight edge apparatus. It will also be observed that the device is capable of being collapsed into a compact unit suitable for retention in a case or box when not in use.

While I have described the invention in terms of specific parts and mechanism, it should be understood that changes and modifications may be practiced within the scope of the appended claims.

I claim:

1. A device of the class described comprising a straight edge mechanism, said straight edge mechanism including ruling edge means angularly supported in the straight edge mechanism for producing a series of lines in predetermined spaced relationship and means for varying the position of angularlity of the ruling edge means, said means for adjusting the ruling edge means consisting of a slotted arm having a scale inscribed thereon, said scale presenting a series of progressively decreasing divisions which indicate a range of changes in dimension of the spacing of the ruled lines occurring in accordance with variation in the angular settings of the ruling edge means.

2. A straight edge attachment for use with a line-up and register table of the class having a straight edge member movable on the table and formed at one side with an elongated rail portion, said attachment comprising a spacing bar and inner and outer fastening blocks secured to opposite ends of the bar, said fastening blocks being constructed and arranged to detachably engage the elongated rail portion at spaced apart points, an angled ruling guide pivotally attached at one end to the inner fastening block and having an adjustment arm adjustably secured at the opposite end thereof, said adjustment arm being slotted and supported in a position to slidably engage over the said outer fastening block and guided in an arcuate path of travel by a stud member fixed in the outer fastening block, and said outer fastening block presenting at the upper side thereof an indicator for registering with a scale on said adjustment arm.

3. A compensating straight edge ruling mechanism for producing a layout sheet for a printing plate of the type which undergoes a small dimensional change when mounted on a printing cylinder, said mechanism including a support member having spaced apart parallel sides on which the straight edge mechanism is arranged to be moved through predetermined distances, said straight edge mechanism including a reference straight edge extending at right angles between the sides and presenting an elongated rail portion, inner and outer fastening blocks detachably secured to the rail portion and having a spacing rod extending therebetween, an adjustable ruling guide pivotally attached to the inner fastening block and having a slotted adjustment arm fixed to the opposite end thereof, said adjustment arm having its slotted end extending into sliding engagement with the outer fastening block, stud means detachably mounted through the slotted end of the arm and the said outer fastening block, said outer fastening block providing at the upper side thereof an indicator and said slotted arm having a scale for registering with the indicator, and a marking device movably supported on the adjustable ruling guide for ruling a series of angularly disposed lines whose spacing is decreased relative to said distances travelled by the reference straight edge a proportionate amount controlled by the degree of angularlity of said ruling guide edge.

4. A structure according to claim 3 in which the scale represents a series of graduated divisions which are representative of changes in angular setting of the ruling guide edge.

References Cited by the Examiner

UNITED STATES PATENTS

| 304,521 | 9/1884 | Gardam | 33—81 |
| 1,006,704 | 10/1911 | Villeneuve | 33—81 X |
| 1,180,083 | 4/1916 | Shiley | 33—81 X |
| 1,579,197 | 3/1926 | Dunham | 33—93 |
| 2,174,137 | 9/1939 | Rotter | 33—80 |
| 2,399,610 | 4/1946 | West et al. | 33—180 |

LEONARD FORMAN, *Primary Examiner*

SAMUEL S. MATTHEWS, *Examiner.*